June 7, 1966 G. IRWIN 3,254,581
FLASH SYNCHRONIZED SHUTTER
Filed June 1, 1964 2 Sheets-Sheet 1

INVENTOR
George Irwin
By McDougall, Hersh & Scott
Attys

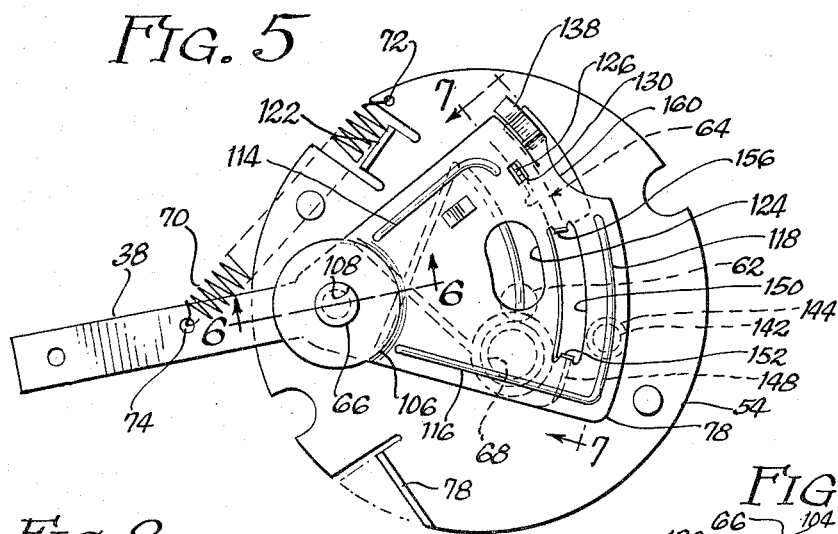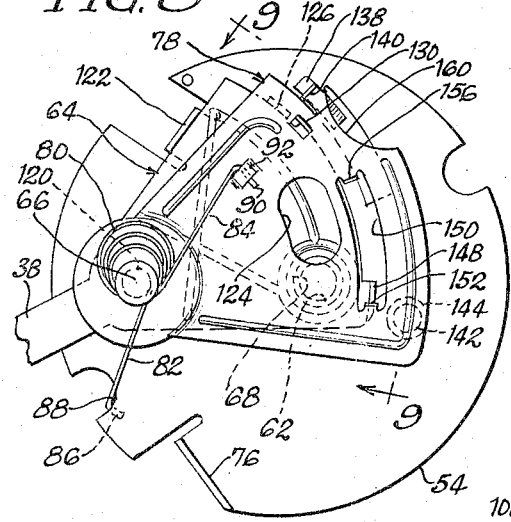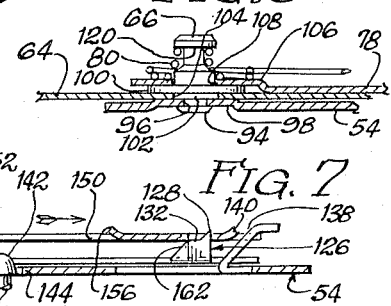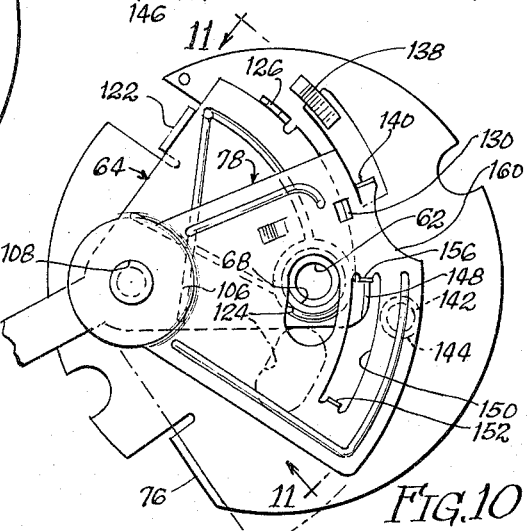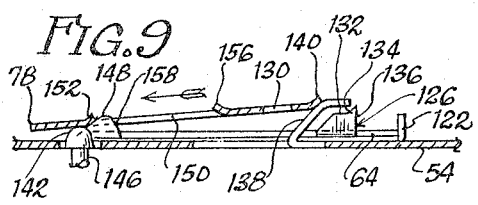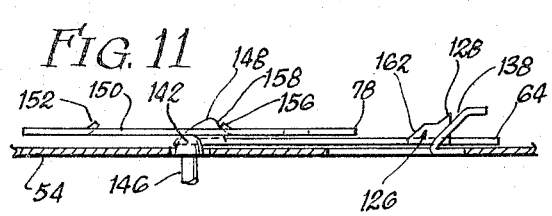
INVENTOR
George Irwin
By McDougall, Hersh & Scott
Att'ys

United States Patent Office 3,254,581
Patented June 7, 1966

3,254,581
FLASH SYNCHRONIZED SHUTTER
George Irwin, Highland Park, Ill., assignor to Imperial Camera Corp., Chicago, Ill., a corporation of Delaware
Filed June 1, 1964, Ser. No. 371,726
10 Claims. (Cl. 95—11.5)

This invention relates to photographic cameras and pertains particularly to a new and improved flash synchronized shutter for such cameras.

One object of the present invention is to provide a new and improved flash camera shutter which is simple and extremely economical in construction and which is particularly well adapted for use in low-priced cameras.

A further object is to provide a new and improved shutter which has only two main moving parts, comprising a masking plate, having an operating lever formed thereon, and a fly plate which is movable rapidly relative to the masking plate and the lens aperture to open the shutter for a brief exposure interval.

Another object is to provide such a shutter having a camming arrangement whereby the fly plate is retarded, so as to prolong the exposure, and whereby the fly plate is moved out of engagement with the flash synchronizing contact as the fly plate completes its return movement.

Another object of the present invention is to provide an extremely economical flash shutter which is highly dependable and foolproof in operation, and in which the flash synchronization is accurate and highly reliable.

Further objects and advantages of the present invention will appear from the following description, taken with the accompanying drawings, in which:

FIG. 5 is an enlarged diagrammatic front view of the shutter, somewhat similar to FIG. 3, but showing the masking plate and the fly plate in changed positions, when the actuating stroke of the masking plate is nearly completed so that the fly plate is about to be unlatched from the masking plate.

FIG. 6 is a fragmentary enlarged section taken through the pivot for the masking plate and the fly plate, generally along the line 6—6 in FIG. 5.

FIG. 7 is a fragmentary sectional view taken generally along the curved line 7—7 in FIG. 5.

FIG. 8 is a front elevational view similar to FIG. 5 but showing the plates in the positions which they occupy just after the fly plate has been released from the masking plate, at the end of the actuating stroke of the masking plate.

FIG. 9 is a fragmentary sectional view taken generally along the curved line 9—9 in FIG. 8.

FIG. 10 is a view similar to FIG. 8 but showing the position of the plates when the fly plate has travelled part way back to its initial position and has engaged the retarding cam.

FIG. 11 is a fragmentary sectional view taken generally along the line 11—11 in FIG. 10.

Figure 1:
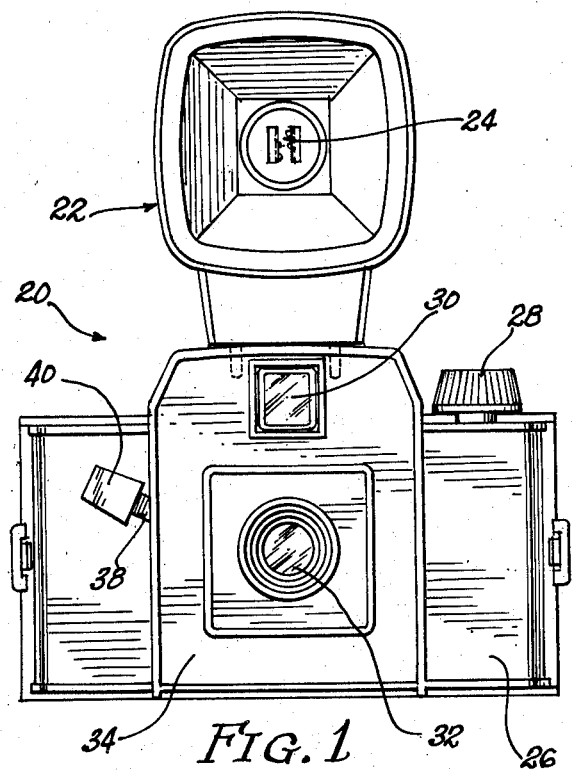
FIGS. 1 and 2 are front and side elevational views of a camera having a flash synchronized shutter to be described as an illustrative embodiment of the present invention.
Figure 2:
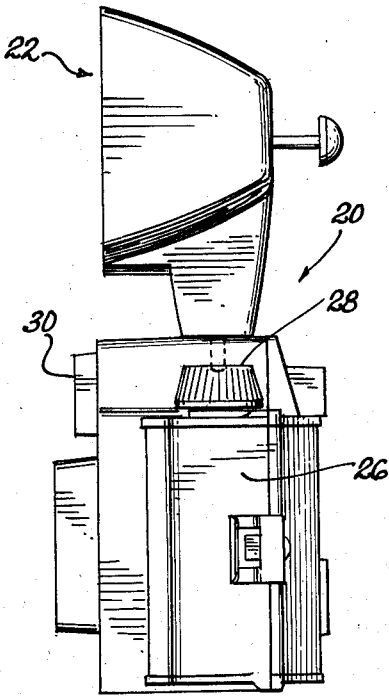

As already indicated, FIGS. 1 and 2 illustrate a photographic camera 20, which is of an inexpensive type, easy to operate and simple in construction. The camera 20 comprises a flash attachment 22 which includes a socket 24 adapted to hold photographic flash bulbs. The camera 20 has the usual features of cameras of this type, including a body or case 26 to hold the film, a winding knob 28 to advance the film, a view finder 30, and a lens 32 to focus images upon the film. The body or case 26 may be molded from resinous plastic material, which provides a construction which is economical and light in weight.

Figure 3:
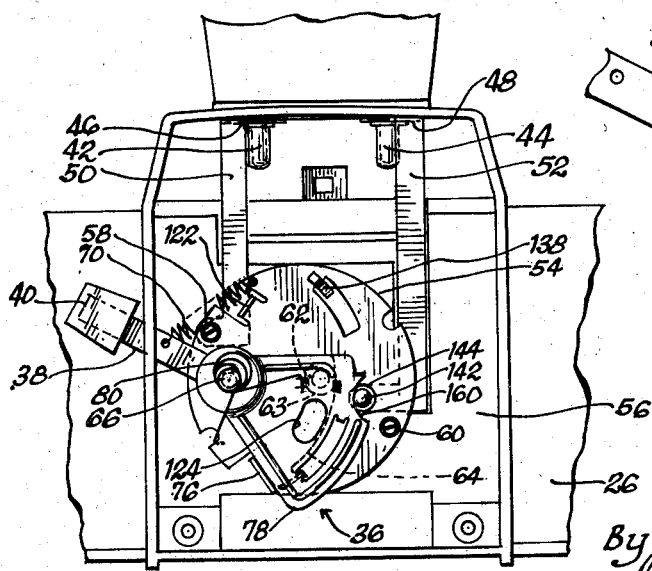
FIG. 3 is a fragmentary front view of the camera with the lens and its supporting plate removed to reveal the flash synchronized shutter, which is shown in its initial position.
Figure 4:
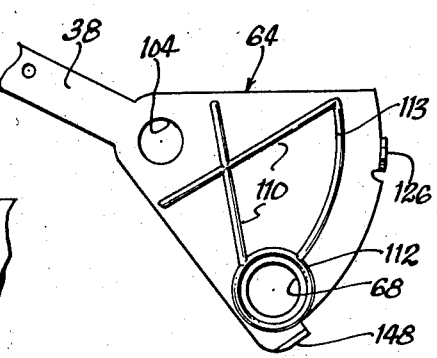
FIG. 4 is a fragmentary enlarged elevational view showing the masking plate and actuating lever, as employed in the flash shutter.

The lens 32 is mounted on a plate or member 34 which also supports certain components of the view finder 30. In FIG. 3, the camera is shown with the plate 34 removed, so as to reveal that a shutter 36 is mounted behind the lens 32. It will be understood that the shutter 36 is adapted to open the aperture of the lens 32 for a brief interval so as to make an exposure on the photographic film. The shutter 36 is provided with an operating lever 38 which may be fitted with a knob 40.

In addition to making the exposure, the shutter 36 is adapted to complete the electrical circuit for the flash attachment 22. Thus, the flash attachment 22 is fitted with prongs or terminals 42 and 44 which are adapted to plug into receptacles or contacts 46 and 48 mounted on the camera body 26, above the shutter 36. The receptacle contacts 46 and 48 are connected to the shutter 36 by means of conductors 50 and 52 which may be in the form of metal strips.

The various components of the illustrated shutter 36 are mounted on a base plate 54 which may be made of metal or other suitable material. It will be seen that the camera body 26 has a front wall 56, to which the base plate 54 is suitably secured, as, for example, by means of screws 58 and 60. The base plate 54 is formed with a hole or aperture 62 which is aligned with the aperture of the lens 32. The front wall 56 has a similar aperture 63 behind the aperture 62 so that light passing through the lens 32 may be focused on the film.

In the illustrated shutter, the operating lever 38 is formed as an integral part of a masking plate 64 which is swingable about a pivot 66 mounted on the base plate 54. The masking plate 64 has an aperture or hole 68 which is movable into alignment with the aperture 62. However, in the initial position of the masking plate 64, the aperture 68 is out of alignment with the aperture 62, so that the aperture 62 is covered by the masking plate 64.

The masking plate 64 is biased toward its initial position by a spring 70, which may be of the coiled tension type and may be hooked between a hole 72 in the base plate 54 and a hole 74 in the operating lever 38. Initially, the spring 70 biases the masking plate 64 against a stop 76 which is in the form of an ear or flange bent upwardly from the base plate 54.

The shutter is also provided with a fly plate or leaf 78 which is also swingable about the pivot 66. A coiled torsion spring 80 is provided to bias the fly leaf 78 in a clockwise direction toward the stop 76. The spring 80 is mounted around the pivot 66 and is provided with arms 82 and 84. As shown, the arm 82 has a hooked end portion 86 which is retained in a notch 88 formed in the base plate 54. The arm 84 has a similar hooked end portion 90 which is retained in an eye or loop 94 struck upward from the fly plate 78.

As shown to best advantage in FIG. 6, the masking plate 64 is movable immediately in front of the base plate 54, while the fly plate 78 is in front of the masking plate 64. The illustrated pivot 66 is in the form of a stud or pin having a rear portion 94 which is riveted into an opening 96 formed in the base plate 54. A forwardly projecting boss 98 is formed on the base plate 54 around the opening 96 to serve as a bearing for the masking plate 64. It will be seen that the masking plate 64 is confined between the boss 98 and an enlarged shoulder or flange 100 which is formed on the pivot 66. The boss 98 and the flange 100 prevent any objectionable amount of rocking or wobbling movement of the masking plate 64. The pivot 66 has a portion 102 which extends through an opening 104 in the masking plate.

The illustrated fly plate 78 has a boss or dished portion 106 which is offset forwardly from the plate and is formed with an opening 108 for receiving the pivot 66. The dished portion 106 etxends rearwardly around the flange 100 and enables the fly plate 78 to slide along the front surface of the masking plate 64. It will be seen that the masking plate 64 is formed with crossing ridges 110 which project forwardly for slidable engagement with the rear side of the fly plate 78. The masking plate 64 is also formed with a circular ridge 112 which extends around the aperture 68. An arcuate ridge 113 extends between the outer end of one of the crossing ridges 110 and one side portion of the circular ridge 112. In addition to providing for free sliding engagement with the fly plate 78, the ridges 110, 112 and 113 stiffen and strengthen the masking plate 64.

It will be seen that the fly plate 78 is formed with generally radial stiffening ridges 114 and 116 which project forwardly therefrom. An arcuate ridge 118 connects with the outer end of the radial ridge 116.

The coiled torsion spring 80 is retained in an annular groove 120 formed in the forwardly projecting portion of the pivot 66. The spring 80 not only retains the fly leaf 78 on the pivot 66 but also biases the fly leaf rearwardly against the masking plate 64.

Initially, both the masking plate 64 and the fly plate 78 are against the stop 76. The shutter is actuated by swinging the lever 38 downwardly or counterclockwise, as viewed from the front. The counterclockwise movement of the masking plate 78 is limited by a stop 122 which is in the form of an ear or flange bent forwardly from the base plate 54. When the masking plate 64 is against the stop 122, the aperture 68 in the masking plate is aligned with the aperture 62 in the base plate 54. As shown, the aperture 124 is in the form of a slot which is elongated along the arcuate path which is traversed by the aperture 124.

Initially, the fly plate 78 is latched to the masking plate 64 so that the fly plate travels with the masking plate when it is swung counterclockwise. When the plates 64 and 78 are latched together, the apertures 68 and 124 are out of alignment, so that no exposure of the film is made during the counterclockwise movement of the plates. Thus, the aperture 124 in the fly plate is covered by the masking plate 64 during the counterclockwise movement of the plates.

To latch the plates 64 and 78 together, the illustrated masking plate 64 is formed with a forwardly projecting prong or tooth 126, shown to best advantage in FIGS. 7, 9 and 11. The tooth 126 may be bent forwardly from the masking plate 64. As shown, the tooth 126 has a triangular point 128 which is adapted to extend forwardly through a slot or opening 130 in the fly plate 78. As already indicated, the spring 80 biases the fly plate 78 rearwardly and thus tends to maintain the fly plate in engagement with the tooth 126. As shown to best advantage in FIGS. 9 and 11, the tooth 126 has a shoulder 132 which limits the extent to which the triangular point extends through the opening 130. The shoulder 132 is engageable with the rear side of the fly plate 78. The triangular point 128 has a ramp surface 134 on one edge and a perpendicular surface 136 on the other edge. During the initial counterclockwise movement of the masking plate 64, the perpendicular surface 136 engages one edge of the slot 130.

As the masking plate 64 approaches the upper stop 122, the fly plate 78 engages a stationary cam 138 which pushes the fly plate forwardly so as to unlatch the fly plate from the tooth 126. The illustrated cam 138 is in the form of an inclined ear which is struck forwardly from the base plate 54. The camming action may be adjusted initially by bending the camming ear 138. It will be seen that the fly plate 78 has a curving ear 140 which is bent forwardly at an inclined angle for smooth engagement with the cam 138.

It will be understood that the fly leaf 78 is displaced forwardly by the cam 138 until the fly leaf is out of latching engagement with the triangular point 128 on the tooth 126, whereupon the fly leaf is returned rapidly to its initial position by the spring 80. During the return movement of the fly leaf 78, the slot 124 passes the aligned apertures 62 and 68, so that light from the lens 32 passes through the apertures to expose the film. The fly leaf or plate 78 comes to rest against the stop 76. The operator then releases the operating lever 38 and allows the masking plate 64 to return in a clockwise direction to the stop 76. As the masking plate 64 approaches the stop 76, the triangular point 128 of the tooth 126 rides behind the fly plate 78 and re-enters the latching slot 130, so that the fly plate 78 is again latched to the masking plate 64.

During its return movement, the fly plate 78 engages an electrical contact point 142 which projects forwardly through a clearance hole 144 in the base plate 54. The contact point 142 may be in the form of a round head on a stud 146 which may be mounted on the plastic front wall 56 of the camera body 26. The contact point 142 is connected to the conductive strip 52. The other conductive strip 50 is connected to the base plate 54. Thus, the moving fly plate 78 completes the electrical circuit between the base plate 54 and the contact point 142. The resulting electrical current ignites the flash bulb in the flash attachment 22.

During the counterclockwise actuating movement of the plates 64 and 78, the fly plate 78 is held forwardly out of engagement with the contact point 142. This is brought about by the shoulder 132 on the tooth 136, and also by a cam 148 which may be in the form of an ear bent forwardly from the masking plate 64. The shoulder 132 and the cam 148 project forwardly beyond the contact point 142 and thus are adapted to hold the fly plate 78 out of engagement with the contact point.

The fly plate 78 has an arcuate slot 150 which is movable opposite the cam 148 when the fly plate 78 is unlatched from the tooth 126. In this way, the fly plate 78 is enabled to move rearwardly into engagement with the contact point 142. The fly plate 78 has a forwardly curving ear or flange 152 which is formed at one end of the slot 150 and is adapted to ride down a ramp surface 154 on the cam 148 during the initial return movement of the fly plate 78, immediately after the unlatching of the fly plate from the tooth 126. This sequence of operations is shown in FIGS. 7 and 9. FIG. 7 represents the position of the plates 64 and 78 just before the fly plate 78 is unlatched from the tooth 126. It will be seen that the rear side of the fly plate 78 engages the cam 148. In FIG. 9, the fly plate 78 has been unlatched, and the curved ear or rider 152 has traveled down the ramp surface 154 to an extent such that the fly plate 78 has engaged the contact point 142.

FIGS. 5 and 8 correspond to FIGS. 7 and 9 and represent the corresponding positions of the plates 64 and 78. It will be seen from FIG. 8 that the fly plate 78 has moved to a position in which the aperture slot 124 is about to pass in front of the aperture 68 in the masking plate 64. Thus, the flash circuit is completed before the exposure of the film, to allow time for the flash bulb to ignite.

At a later stage in the return movement of the fly plate 78, the cam 148 retards the return movement of the fly plate to as to reduce the speed of the shutter and prolong the exposure of the film. FIGS. 10 and 11 illustrate the fly plate 78 in the position in which the cam 148 is beginning its retarding action. It will be seen that the fly plate has a forwardly curving flange or ear 156 which is disposed at the counterclockwise end of the slot 150.

The flange 156 is adapted to engage a relatively steep ramp surface 158 on the opposite side of the cam from the ramp surface 154. Thus, the flange 156 rides up and over the cam 148, so that the fly plate 78 is displaced forwardly. Due to the inertia of the fly plate 78 and the friction between the flange 156 and the cam 148, the forward displacement of the fly plate 78 retards the return movement of the plate. At the same time, the forward displacement of the fly plate causes the fly plate to become disengaged from the electrical contact 142. Thus, the electrical control circuit for the flash attachment 22 is open when the fly plate completes its return movement.

It will be seen from FIG. 10 that the retarding action of the cam 148 begins while the aperture slot 124 in the fly plate 78 is still opposite the aligned apertures 62 and 68, so that the cam 148 has the effect of retarding the closure of the shutter for a brief interval.

The fly plate 78 has a cut-out or notch 160 which is opposite the electrical contact 148 when the fly plate has been fully returned to its initial position. The cut-out 160 obviates any possibility of engagement between the fly plate 78 and the electrical contact 148 when the fly plate is in its fully returned position. The masking plate 64 is smaller than the fly plate 78, so that there is ample clearance between the electrical contact 148 and the masking plate.

When the operator allows the masking plate 64 to return to its initial position, the latching tooth 126 engages the upper edge of the fly plate and displaces it forwardly. For this purpose, the tooth 126 has a ramp surface 162. The tooth 126 passes behind the fly plate 78 so that the triangular tooth 128 can enter the slot 130 in the fly plate, just before the masking plate engages the return stop 76. The plates 64 and 78 are then in their initial positions, in which the fly plate is held forwardly away from the electrical contact 148 by the tooth 126 and the cam 148.

While the operation of the shutter has already been described, it may be helpful to offer a brief summary. The shutter is operated by moving the actuating lever 38 downwardly, so as to swing the masking plate 64, upwardly, against the biasing action of the return spring 70. The fly plate 78 swings upwardly with the masking plate 64, due to the reception of a latching tooth 126 in the latching slot 130. As the plates 64 and 78 approach the forward stop 122, the fly plate 78 is displaced forwardly by the stationary cam 138. This has the effect of unlatching the fly plate 78 from the latching tooth 126, whereupon the spring 80 causes the fly plate 78 to return rapidly toward the return stop 76.

Near the beginning of the return movement of the fly plate, the flange or shoe 152 rides down the ramp surface 154 on the cam 148, under the rearward impetus of the spring 80. Thus, the fly plate 78 is moved rearwardly into engagement with the electrical contact 142. Thus, the electrical circuit is completed to ignite the flash bulb in the flash attachment 22. Shortly thereafter, the aperture slot 124 in the fly plate moves opposite the aligned apertures 62 and 68 in the base plate 54 and the masking plate 64.

Return movement of the fly plate 78 is retarded by the engagement of the flange or shoe 156 with the cam 148, which displaces the fly plate 78 forwardly. This forward displacement slows down the return movement of the fly plate 78 and also breaks the electrical circuit between the fly plate and the contact point 142.

When the fly plate 78 reaches the return stop 76, the fly plate again covers the apertures 62 and 68. The cut-out 160 in the fly plate is opposite the electrical contact 142 so that the fly plate does not engage the electrical contact. The operator allows the masking plate 64 to return to its initial position against the return stop 76, so that the fly plate will again be latched to the masking plate 64, upon the entry of the latching tooth 126 into the slot 130. The cam 148 engages the shoe or flange 152 and displaces the fly plate forwardly, away from the electrical contact 142.

It will be understood that the shutter of the present invention is easy to manufacture and extremely economical. Nevertheless, the shutter is positive and dependable in operation. The flash synchronization is accurate and positive.

Various other modifications, alternative constructions and equivalents may be employed without departing from the true spirit and scope of the invention, as exemplified in the foregoing description and defined in the following claims.

I claim:

1. In a flash synchronized shutter, the combination comprising a base plate having a first aperture therein, a masking plate swingably mounted on said base plate between an initial position and an actuated position, said masking plate having a second aperture therein movable opposite said first aperture when said masking plate is moved to said actuated position, a first return spring biasing said masking plate toward said initial position, a fly plate mounted on said base plate for swinging movement about the same axis as said masking plate, interengageable latching elements on said masking plate and said fly plate for latching said fly plate to said masking plate so that said fly plate will travel with said masking plate when said masking plate is swung toward said actuated position, an unlatching cam on said base plate and engageable by said fly plate as said masking plate and said fly plate approach said actuated position, said cam being operative to displace said fly plate away from said masking plate so as to disengage said latching elements and release said fly plate from said masking plate, a second return spring connected to said fly plate for rapidly returning said fly plate to said initial position, said fly plate having a third aperture movable past said second aperture during return movement of said fly plate, a stationary electrical contact in the path of the swinging movement of said fly plate and engageable by said fly plate during return movement thereof, and a second cam on said masking plate and operative to engage said fly plate when said fly plate is latched to said masking plate for displacing said fly plate out of engagement with said contact during the actuating movement of said masking plate, said fly plate being movable off of said second cam upon being unlatched from said masking plate, said fly plate having an element engageable with said second cam and operative to ride over said second cam to retard the return movement of said fly plate while also disengaging said fly plate from said contact.

2. In a flash synchronized shutter, the combination comprising a supporting member, a masking member and a fly member swingably mounted on said supporting member and swingable about the same axis, said masking member having a first aperture therein, stop means limiting swinging movement of said masking member between an initial position and an actuated position, the swinging movement of said fly member also being limited by said stop means, spring means biasing said masking member and said fly member toward said initial position, latching elements on said masking member and said fly member for latching said fly member to said latching member during initial movement of said masking member toward said actuated position, means for unlatching said fly member from said masking member as said masking member approaches said actuated position, said spring means thereupon being operative to return said fly member to said initial position, said fly member having a second aperture therein movable past said first aperture in said masking member during the return movement of said fly member, an electrical contact in the path of said fly member and engageable by said fly member during the return movement thereof, and means on said masking member for holding said fly member out of engagement with said electrical contact during the actuating movement of said masking member.

3. In a flash synchronized shutter, the combination comprising a base plate having a pivot thereon, a masking plate adjacent said base plate and swingably mounted on said pivot, an operating lever connected to said masking plate, said base plate having a return stop and a forward stop thereon limiting swinging movement of said masking plate between an initial position and an actuated position, first spring means biasing said masking plate toward said initial position, a first aperture in said base plate, a second aperture in said masking plate and movable opposite said first aperture upon movement of said masking plate to said actuated position, a fly plate swingably mounted on said pivot in front of said masking plate. the swinging movement of said fly plate being limited by said stops, second spring means biasing said latching plate toward said return stop, a latching slot in said fly plate, a latching tooth on said masking plate and receivable in said slot to latch the fly plate to said masking plate during initial movement of said masking plate toward said actuated position, an unlatching cam on said base plate for displacing said fly plate forwardly to unlatch said fly plate from said masking plate as said fly plate approaches said actuated position, said second spring means thereupon being operative to return said fly plate to said initial position, said fly plate having a third aperture therein movable past said second aperture during the return movement of said fly plate, a stationary electrical contact in the path of swinging movement of said fly plate and engageable by said fly plate during the return movement thereof, an additional cam projecting forwardly from said masking plate for displacing said fly plate out of engagement with said electrical contact, said fly plate having a portion operative to engage said additional cam while said fly plate is latched to said masking plate, said fly plate having an additional slot therein for receiving said additional cam during initial return movement of said fly plate, said second spring means being effective to move said fly plate rearwardly against said electrical contact when said additional cam is received in said additional slot, said fly plate having an additional portion engageable with said additional cam during the return movement of said fly plate to retard such return movement while disengaging said fly plate from said electrical contact, said fly plate having a cut-out opposite said contact when said fly plate is in said initial position.

4. In a flash synchronized shutter, the combination comprising a supporting member having a pivot thereon, a masking member swingably mounted on said pivot, stop means limiting the swinging movement of said masking member between initial and actuated positions, a fly member swingably mounted on said pivot, the swinging movement of said fly member being limited by said stop means, spring means biasing said masking member and said fly member toward said initial position, said masking member and said fly member having first and second apertures therein which are out of alignment when said members are in said initial position, means for latching said fly member to said masking member during initial movement thereof toward said actuated position, an electrical contact in the path of swinging movement of said fly member, means for unlatching said fly member from said masking member when said masking member approaches said actuated position, said spring means thereby being operative to return said fly member to said initial position, said second aperture in said fly member being movable past said first aperture in said masking member during the return movement of said fly member, and camming means for holding said fly member away from said electrical contact when said fly member is latched to said masking member while releasing said fly member for engagement with said contact during the return movement of said fly member.

5. In a flash synchronized shutter, the combination comprising a supporting member, a masking member and a fly member swingably mounted on said supporting member, stop means limiting the swinging movement of said masking and fly members between initial and actuated positions, spring means biasing said masking and fly members toward said initial position, said masking and fly members having first and second openings therein which are out of alignment when said members are in said initial position, means for connecting said fly member to said masking member during initial movement thereof toward said actutaed position, an electrical contact in the path of swinging movement of said fly member, means for disconnecting said fly member from said masking member when said masking member approaches said actuated position, said spring means thereupon being operative to return said fly member to said initial position, said second opening in said fly member being movable past said first opening in said masking member during the return movement of said fly member, and camming means for holding said fly member away from said electrical contact when said fly member is connected to said masking member while releasing said fly member for engagement with said contact during the return movement of said fly member when said fly member is disconnected from said latching member.

6. In a flash synchronized shutter, the combination comprising a supporting member having pivot means thereon, a masking member and a fly member swingably mounted on said pivot means, a return stop and a forward stop limiting the swinging movement of said masking and fly members, spring means biasing said masking and fly members toward an initial position against said return stop, said masking and fly members having apertures therein which are out of alignment when said masking and fly members are in said initial position, latching elements on said masking and fly members for latching said fly member to said masking member during movement thereof toward said forward stop, an electrical contact in the path of swinging movement of said fly member, means for unlatching said fly member from said masking member when said masking member approaches said forward stop, said spring means thereupon being operative to return said fly member to said initial position, said aperture in said fly member being movable past said aperture in said masking member during return movement of said fly member, and a cam on said masking member for holding said fly member away from said electrical contact when said fly member is latched to said masking member, said fly member having an element which is movable off said cam to release said fly member for engagement with said contact during the return movement of said fly member.

7. In a flash synchronized shutter, the combination comprising a supporting member having pivot means thereon, a masking plate and a fly plate swingably mounted on said pivot means, a return stop and a forward stop limiting the swinging movement of said masking plate, said return stop also limiting the movement of said fly plate, spring means biasing said plates toward an initial position against said return stop, said plates having apertures therein which are out of alignment when said plates are in said initial position, latching elements on said plates for latching said fly plate to said masking plate so that said fly plate will travel with said masking plate during movement thereof toward said forward stop, an electrical contact in the path of swinging movement of said fly plate, means for unlatching said fly plate from said masking plate when said masking plate approaches said forward stop, said spring means thereupon being operative to return said fly plate to said initial position, said aperture in said fly plate being movable past said aperture in said masking plate during return movement of said fly plate, a cam projecting from said masking plate, a first follower element on said fly plate for engaging said cam to hold said fly plate away from said electrical contact when said fly plate is latched to said masking plate, said first follower element being movable off said cam during initial return movement of said fly plate to bring said fly plate into engagement with said contact, said fly plate having an opening therein for receiving said cam after movement of said first follower element off said cam, and a second follower element on said fly plate and engageable with said cam during subsequent return movement of said fly plate for retarding the return movement thereof while also disengaging said fly plate from said contact.

8. In a flash synchronized shutter, the combination comprising a supporting member having pivot means thereon, a masking plate and a fly plate swingably mounted on said pivot means, a return stop and a forward stop limiting swinging movement of said masking plate between an initial position and an actuated position, first and second spring means biasing said masking and fly plates against said return stops, apertures in said masking and fly plates, said apertures being out of alignment in said initial position, a latching tooth projecting forwardly from said masking plate, a latching element on said fly plate and engageable with said tooth for latching said fly plate to said masking plate during initial movement of said masking plate toward said actuated position, camming means on said supporting member for displacing said fly plate forwardly to unlatch said fly plate from said masking plate as said masking plate approaches said actuated position, said second spring means thereupon being operative to return said fly plate to said initial position, said aperture in said fly plate being movable past said aperture in said masking plate during the return movement of said fly plate, a stationary electrical contact in the path of swinging movement of said fly plate and engageable by said fly plate during the return movement thereof, a cam projecting forwardly from said masking plate, a first rider portion on said fly plate for engaging said cam and displacing said fly plate out of engagement with said electrical contact when said fly plate is latched to said masking plate, said first rider portion being movable off said cam during initial return movement of said fly plate, and a second rider portion on said fly plate and engageable with said cam during subsequent return movement of said fly plate to retard such return movement.

9. In a flash synchronized shutter, the combination comprising a supporting member having pivot means thereon, a masking plate and a fly plate swingably mounted on said pivot means, a return stop and a forward stop limiting the swinging movement of said masking plate between initial and actuated positions, said return stop also limiting the swinging movement of said fly plate, spring means biasing said plates toward said initial position, said plates having apertures therein which are out of alignment in said initial position, an electrical contact in the path of swinging movement of said fly plate, a projection on said masking plate, a rider element on said fly plate and engageable with said projection in said initial position for holding said fly plate away from said electrical contact, means for latching said fly plate to said masking plate in said initial position so that said fly plate is carried with said masking plate during initial movement thereof toward said actuated position, means for releasing said fly plate from said masking plate as said masking plate approaches said actuated position, said spring means thereupon being operative to return said fly plate to said initial position, said aperture in said fly plate being movable past said aperture in said masking plate during such return movement, said rider element being movable off said projection to bring said fly plate into engagement with said electrical contact during such return movement of said fly plate.

10. In a flash synchronized shutter, the combination comprising a supporting member having pivot means thereon, a masking plate and a fly plate swingably mounted on said pivot means, return and forward stop means limiting the swinging movement of said masking plate between initial and actuated positions, said return stop means also limiting the movement of said fly plate, spring means biasing said masking and fly plates toward said initial position, said plates having apertures therein which are out of alignment in said initial position, an electrical contact in the path of swinging movement of said fly plate, a latching tooth and a cam projecting forwardly from said masking plate and operative to hold said fly plate away from said contact in said initial position, said fly plate having a latching portion with a latching slot therein for receiving the end of said tooth, said tooth having a shoulder thereon for engaging said latching portion and limiting the entry of said tooth into said slot, said fly plate having a first rider portion engageable with said cam in said initial position, said latching tooth being operative to carry said fly plate with said masking plate during initial movement thereof toward said actuated position, camming means on said supporting member for displacing said fly plate forwardly and thereby releasing said fly plate from said tooth as said masking plate approaches said actuated position, said spring means thereupon being operative to return said fly plate to said initial position, said rider portion being movable off said cam while said latching portion is movable off said tooth during initial return movement of said fly plate, said spring means thereupon being operative to move said fly plate against said electrical contact, said aperture in said fly plate being movable past said aperture in said masking plate during return movement of said fly plate, and a second rider portion engageable with said cam to displace said fly plate forwardly and retard the return movement thereof while also disengaging said fly plate from said electrical contact.

References Cited by the Examiner
UNITED STATES PATENTS
2,498,277    2/1950    Kaplowitz _____ 95—11.5

JOHN M. HORAN, *Primary Examiner.*